US009814259B1

(12) United States Patent
Richmond et al.

(10) Patent No.: US 9,814,259 B1
(45) Date of Patent: Nov. 14, 2017

(54) COMPACT SYSTEM FOR PREPARING PERSONAL SMOKABLE PRODUCTS (71) Applicant: BANANA BROS LLC, Culver City, CA (US)

(72) Inventors: David Richmond, Culver City, CA (US); Howard Richmond, Los Angeles, CA (US); Manuel A. Montano, Gardena, CA (US)

(73) Assignee: Banana Bros. LLC, Culver City, CA (US)

( * ) Notice: Subject to any disclaimer, the term of this patent is extended or adjusted under 35 U.S.C. 154(b) by 0 days.

(21) Appl. No.: 15/447,069

(22) Filed: Mar. 1, 2017

Related U.S. Application Data

(60) Provisional application No. 62/450,535, filed on Jan. 25, 2017.

(51) Int. Cl.
*A24C 5/42* (2006.01)
*A24C 5/44* (2006.01)
(Continued)

(52) U.S. Cl.
CPC .............. *A24C 5/42* (2013.01); *A24B 7/04* (2013.01); *A24C 5/06* (2013.01); *A24C 5/44* (2013.01);
(Continued)

(58) Field of Classification Search
CPC ....... B02C 18/06; B02C 18/062; B02C 18/08; B02C 18/22; B02C 18/2216; A47J 42/12; A47J 42/14; A24C 5/02; A24C 5/42
See application file for complete search history.

(56) References Cited

U.S. PATENT DOCUMENTS 2,668,545 A * 2/1954 Burnstein ................ A24C 5/42
  131/70
4,572,216 A * 2/1986 Josuttis ..................... A24C 5/02
  131/70
(Continued)

FOREIGN PATENT DOCUMENTS

DE     3427480 A1   2/1986
DK      177367 B1   2/2013
(Continued)

OTHER PUBLICATIONS

Smokazon Blog, "The Best Weed Grinders 2017—The Complete Guide You'll Ever Need!," printout of web pages from https://blog.smokazon.com/best-weed-grinders/, printed Feb. 13, 2017 (17 pages).

*Primary Examiner* — Michael H Wilson
*Assistant Examiner* — Dionne W Mayes
(74) *Attorney, Agent, or Firm* — Laura M. Lloyd; Jeffrey G. Sheldon; Cislo & Thomas, LLP (57) ABSTRACT

A system for preparing smokeable material comprising a wall providing an upper chamber and a lower chamber with a grate between the chambers. Feed smokeable material in the upper chamber has its size reduced with a size reducer a sufficient amount that it can pass through the grade into the lower chamber as fill smokeable material. A support below the lower chamber is provided for supporting a wrapper. There is an opening in the lower chamber for fill smokeable material to pass into the wrapper. An axially moveable tamper can tamp the fill smokeable material in the wrapper. Biasing means bias the wall and tamper into the upper position. A mechanism is provided for moving the tamper from its upper position to its lower position against the biasing means for tamping the smokeable material in the wrapper.

16 Claims, 10 Drawing Sheets

(51) Int. Cl.
*A24C 5/06* (2006.01)
*A24B 7/04* (2006.01)
*A47J 42/26* (2006.01)
*B02C 18/10* (2006.01)
*B02C 23/16* (2006.01)
*B02C 7/04* (2006.01)

(52) U.S. Cl.
CPC .................. *A47J 42/26* (2013.01); *B02C 7/04* (2013.01); *B02C 18/10* (2013.01); *B02C 23/16* (2013.01); *B02C 2023/165* (2013.01)

(56) References Cited

U.S. PATENT DOCUMENTS

2010/0301806 A1* 12/2010 Ormaza .................. A47J 42/26
 320/115
2013/0047996 A1* 2/2013 Ryszard .................... A24C 5/06
 131/70
2015/0298135 A1* 10/2015 Spielman ............. B02C 18/144
 241/101.01
2016/0029691 A1* 2/2016 Ruzycky .................. A24C 5/02
 241/24.1

FOREIGN PATENT DOCUMENTS

| EP | 1374705 A1 | 2/2004 |
| GB | 19383 A | 0/1904 |
| GB | 2124882 A | 2/1984 |
| WO | 02056714 A1 | 7/2002 |

* cited by examiner

COMPACT SYSTEM FOR PREPARING PERSONAL SMOKABLE PRODUCTS

CROSS-REFERENCE TO RELATED APPLICATIONS

The present Application claims the benefit of U.S. Provisional Patent Application No. 62/450,535 titled "Compact System for Preparing Personal Smokeable Products," filed Jan. 25, 2017, the contents of which are incorporated in this disclosure by reference in their entirety.

BACKGROUND

Products for preparing cigarettes and other smokeable products are known. For example, see: WO02056714A1, DK177367B, DE3427480A1, GB2124882, and EP1374705A1.

A problem with many existing products is that they are unable to quickly and easily prepare a smokeable product starting with gross sized feed material. It is desirable that there be a portable, easy to use device that can produce a final product in a short a period of time, such as production of a final product in 10 seconds.

SUMMARY

This invention provides a system, including an apparatus and a method that satisfies this need. The apparatus can be portable and hand holdable. The apparatus comprises a wall providing an upper chamber and a lower chamber, with a grate between the chambers. A fill inlet can be used for placing feed smokeable material into the upper chamber. A cutting mechanism, such as a rotatable size reducer, located in the upper chamber allows for reducing the size of feed smokeable material in the upper chamber a sufficient amount that size reduced smokeable material can pass through the grate into the lower chamber, where it can be used as fill smokeable material.

A support is provided below the lower chamber for supporting a wrapper below the lower chamber, and optionally extending through the opening of the lower chamber. The support is removably attached to the lower chamber. There is an opening in the lower chamber that allows for fill smokeable material to pass into the wrapper supported by the support.

To make the device an all in one device that can start with feed material and end with a wrapper filled smokeable material, preferably a moveable tamper is in the lower chamber for tamping fill smokeable material in the wrapper. The tamper has an upper position and a lower position. Preferably a biasing means such as a spring is provided for biasing the tamper into its upper position, and a mechanism for moving the tamper from its upper position to a lower position against the biasing means for the purpose of tamping the smokeable material in the wrapper.

Preferably the tamping mechanism also provides a piston-like effect so that pushing downwardly compresses air in the lower chamber, thereby forcing fill smokeable material into the wrapper and compressing it therein for a consistent, uniform smoke.

There is also provided a spring biasing the enclosing wall to the upper position, wherein the enclosing wall is movable downwardly from an upper position to a lower position relative to the support for moving the grate downwardly. The biasing means can be located in the wall. The tamper also moves downwardly to tamp fill smokeable material in the wrapper.

The drive can be manual or powered. When powered, the drive can comprise a blade in the upper chamber, a motor for rotating the blade, a power source such as a battery or external power source for driving the motor, and a switch for turning the power source off and on. The switch can provide variable speeds, have fixed different speed positions, or be an on-off switch for a constant speed motor. The switch is preferably located on the outside of the wall.

In a manual version of the invention, which can optionally be provided with the powered version, the rotatable size reducer can comprise a coupler coupling the upper portion of the wall to the rotatable size reducer for rotating the size reducer, wherein the upper portion of the wall is rotatable relative to the lower portion of the wall and is graspable by a user's hand.

Preferably the support is tubular with a generally cylindrical elongated opening for receiving the wrapper, which can be a conventional wrapper such as a cigarette wrapper. The elongated opening can be conical, being wider at the top than at the bottom for receiving a conical shaped wrapper. Preferably the support is easily removably secured in position such as by a magnet. For example, the support can be removably secured to the grate and can be removed from the lower portion of the housing for attachment to the upper portion of the housing.

Optionally, a projection can be supported by the wall, where the projection is sized for pushing a wrapper containing smokeable material partially out of the support for easy access by a user for removing the wrapper out of the support.

The apparatus can be provided with a wrapper or without a wrapper.

Preferably at least the bottom portion of the tamper is made from flexible material such as rubber, the stiffness of the rubber controlling how much compression can be provided to the fill smokeable material in the wrapper. The apparatus can be provided as a kit comprising two or more tampers, differing in size and/or hardness. Also, the invention contemplates selling the tamper separately from the remainder of the apparatus, wherein the tamper is removable, such as being held in place by a magnet.

Similarly, the grate can be removable so grates with different sized holes can be used depending on the preference of a user.

The size reducer can comprise a blade, a grinder/chopper, mincer or combination thereof. For example, a grinding plate having first grinding projections opposed to second grinding projections, which can be on the grate, can be used for grinding feed smokeable material between the projections.

The opening in the lower chamber can be funnel shaped, being narrower at the bottom than at the top, and preferably shaped at the bottom to fit into the top opening of the wrapper.

Preferably at least a portion of the housing is sufficiently translucent or transparent so that feed smokeable material in the upper chamber is visible to a user.

Optionally the apparatus includes a storage area for smokeable material above the upper chamber, separate from both the upper and lower chambers.

The fill inlet can be an opening in the upper chamber of the wall such as a door.

In a method of using the apparatus, feed smokeable material is placed through the fill opening into the upper chamber. If the device includes a storage chamber, the feed material can be taken from the storage chamber. A wrapper is supported with the support. The size reducer is activated for reducing the size of feed smokeable material so at least a portion of the smokeable material falls through the grate so smokeable material falls into the lower chamber and thereafter through the opening in the lower chamber into the wrapper. If the tamper is provided, the tamper is forced downwardly against the force of the biasing means for tamping fill smokeable material in the wrapper. The user can inspect the wrapper for the amount of smokeable fill material in the wrapper, and if more fill is desired, tamping can be repeated. Subsequently, the support is removed from the lower chamber and filled wrapper is removed from the support, and then the support can be reattached to the lower chamber. The tamping can be performed multiple times.

In the version of the invention where there is a projection on the housing sized for pushing the wrapper containing fill smokeable material from the support after removing the support from the lower chamber, the projection can be used to push the wrapper containing fill smokeable material from the support. The support can be attached to the upper portion of the wall after being removed.

In the powered version of the invention, optionally the motor can be adapted to vibrate smokeable material in the upper chamber to help the feed material engage the size reducer as well as vibrate the lower chamber and support in order to aid in packing the smokeable material into the wrapper.

There are many advantages to the present invention, not all of which need to be present in every version of the invention. Exemplary of the advantages are that the system can:
1. be portable;
2. be hand holdable;
3. produce a smokeable product from feed material within as few as 10 seconds;
4. be inexpensive;
5. be compact;
6. provide everything needed starting with raw feed material to a final product;
7. be adjustable by the user with replaceable tampers;
8. be adjustable by the user by interchanging grates;
9. provide a storage compartment;
10. allow visibility of the feed material in at least the upper chamber so that the user can be sure to have sufficient material;
11. provide a mechanism for easily removing the filled wrapper from a support;
12. be used with conventional, commercially available wrappers;
13. with the tamping feature, allow the user to a desired amount of compression and fill; and
14. for users without sufficient wrist strength or a handicap, powered (with or without being mechanical usable).

DRAWINGS

These and other features, aspects, and advantages of the present invention will become better understood with regard to the following description, appended claims, and accompanying drawings where:

DESCRIPTION

In general, with regard to FIGS. 1 to 21, an apparatus 100, 200, 300, 400 according to the present invention can comprise, as its main elements a wall 102 providing an upper chamber 104 and a lower chamber 106, a grate 112 between the chambers, a fill inlet 156 for placing feed smokeable material into the upper chamber 104, a rotatable size reducer 230 in the upper chamber 104 for reducing the size of feed smokeable material in the upper chamber 104, a drive 226 for rotating the rotatable size reducer 230, a support 110 below the lower chamber 106 for supporting a wrapper 120 below the lower chamber 106, an opening in the lower chamber 106 for fill smokeable material to pass into the wrapper 120 supported by the support 110, and an axially moveable tamper 142 in the lower chamber 106 for tamping fill smokeable material in the wrapper 120.

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used herein, the term "comprise" and variations of the term, such as "comprising" and "comprises," are not intended to exclude other additives, components, integers or steps.

As used herein, "smokeable material" can be any material that is able to be smoked such as, for example, tobacco, marijuana, herbs, or a medicinal substance. The smokeable material can be pure, or it can contain material such as stems or seeds that can be smoked even if not removed, and additives such as flavorants.

"Feed" smokeable material refers to starting smokeable material. Feed smokeable material can contain a large portion of smokeable material, as well as seeds and stems.

As used herein, smokeable material that is cut or sized to pass through the grate is referred to as "fill" smokeable material. The fill smokeable material is cut by a size reducer a sufficient amount such that the cut smokeable material can pass through the grate into the lower chamber. However, it is possible that the feed smokeable material can be correctly sized to pass through the grate without being cut by the size reducer.

The term "fill inlet" as used herein is an inlet into the upper chamber of an apparatus according to this invention used to place feed smokeable material into the upper chamber. The fill inlet can be an opening in the wall of the upper chamber. Optionally, the opening has a door.

A "grate" contains holes such that the fill smokeable material can pass through the holes of the grate and into the lower chamber. The grate can be removable. The grate can be made from metal, plastic, or the like.

A "smokeable product" is the wrapper containing fill smokeable material. The smokeable product can be, for example, a tobacco cigarette, a marijuana cigarette, or a *cannabis* cigarette.

The term "wrapper" as used herein refers to a paper or other combustible material such as tobacco leaf such as is used for cigars. Preferably, the wrapper is conical and sized to fit into the support.

A "tamper" as used herein, is an object used for tamping, or compressing, smokeable material into the wrapper.

With reference to FIGS. 1 to 21, an apparatus 100, 200, 300, 400 having features of the invention can be used to quickly and easily make a cigarette made out of tobacco or other smokeable material. The apparatus 100, 200, 300, 400 can be portable, and is preferably sized to be hand-held.

An enclosing wall 102 provides an upper chamber 104 and a lower chamber 106. The chambers can be any shape, such as, for example, the chambers can have a circular or ovoid shape in horizontal cross-section. The enclosing wall 102 can be made out of any type of rigid material, such as, for example, plastic, glass, or metal. Part or all of the wall 102 can be transparent or translucent such that smokeable material is visible inside the upper chamber 104, lower chamber 106, or both chambers. Additionally, there can be decorative lights located in the wall 102.

Figure 1:
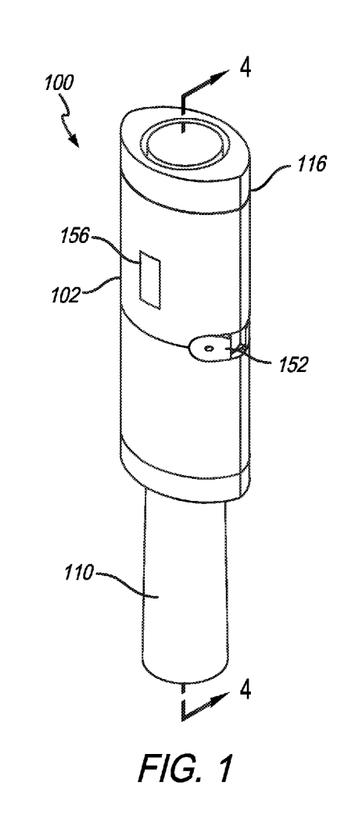
FIG. 1 is a perspective view of a first apparatus having features of the present invention.
Figure 2:
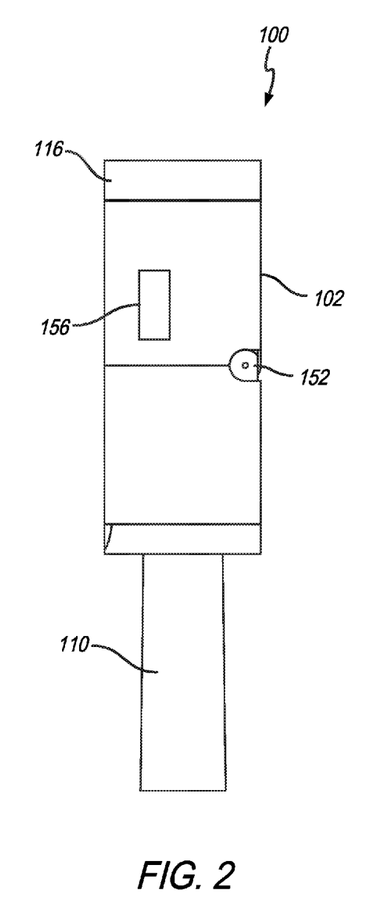
FIG. 2 is a front elevation view of the apparatus of FIG. 1.
Figures 3, 4, 5:
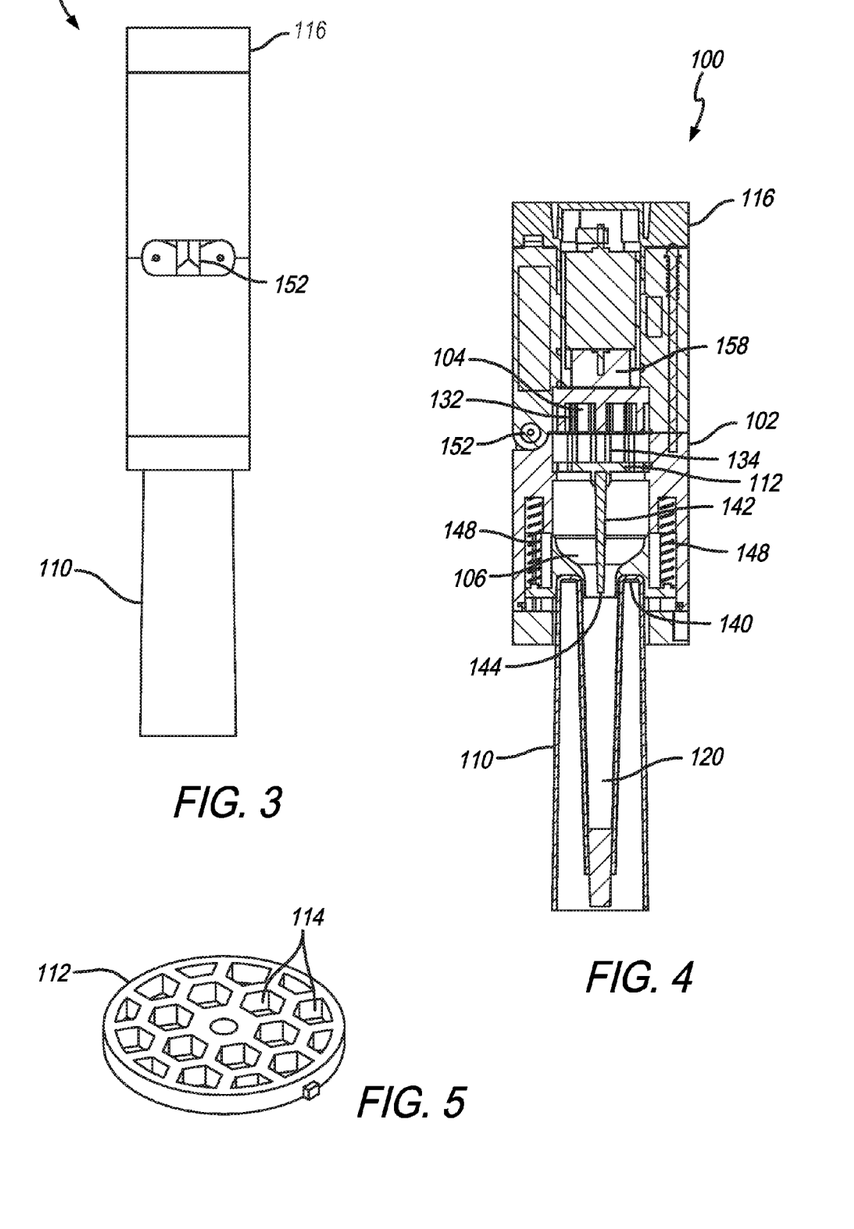
FIG. 3 is a side elevation view of the apparatus of FIG. 1.
FIG. 4 is a longitudinal sectional view of the apparatus of FIG. 1 taken on line 4-4 in FIG. 1.
FIG. 5 is a perspective view of one embodiment of the grate.
Figure 6:
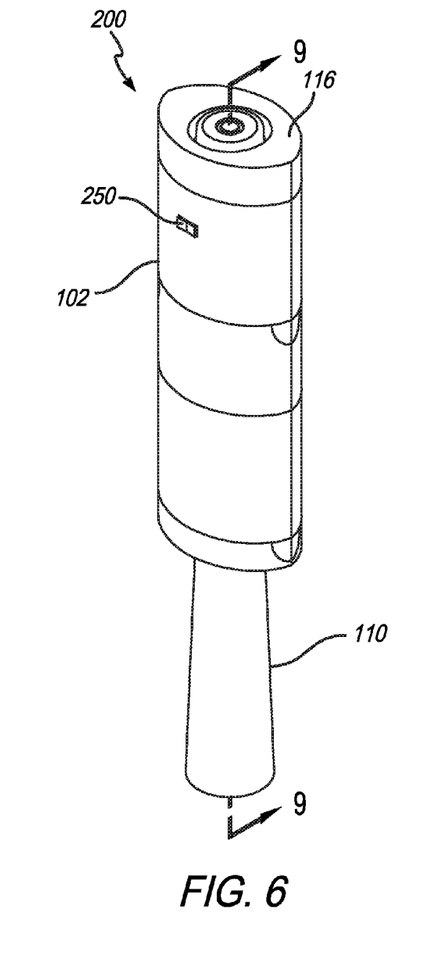
FIG. 6 is a perspective view of a second apparatus having features of the present invention.
Figure 7:
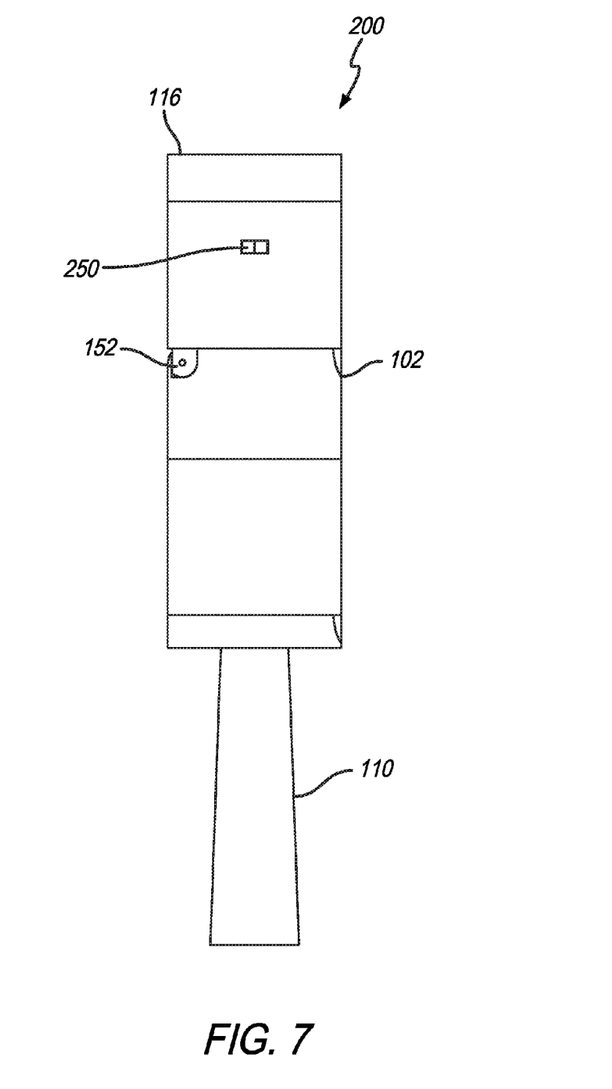
FIG. 7 is a front elevation view of the apparatus of FIG. 6.

The upper chamber 104 provides a receptacle for the feed smokeable material. The feed smokeable material can be directly placed in the upper chamber 104 upon separation of a lid 116 from the upper chamber 104, or there can be a fill inlet 156 such as a door or a flap in the wall 102 or lid 116 such that feed smokeable material can be placed in or added to the upper chamber 104 without separating the lid 116 from the upper chamber 104, as shown in FIGS. 1-3. In one embodiment, the upper chamber 104 contains a manual or automatic size reducer, described further below.

The apparatus 100, 200, 300, 400 contains a grate 112 located between the upper chamber 104 and the lower chamber 106. The grate 112 is made out of a rigid or semi-rigid material such as, for example, plastic or metal. As shown in FIG. 5, the grate 112 contains holes 114 such that the cut smokeable material can pass through the grate 112 and into the lower chamber 106. The size of the holes 114 in the grate 112 can be from about 1 mm to about 10 mm in diameter with from about from about 4 to about 425 holes per square 25 mm. However, the holes 114 do not have to be circular; they can be any shape that allows the fill smokeable material to pass through the grate 112 from the upper chamber 104 to the lower chamber 106. The grate 112 can be removable so that it can be cleaned, or so that a grate 112 with different sized holes 114 can be used.

As shown in FIGS. 4, 9, 13-15 and 19-21, the lower chamber 106 has an opening so that cut, or fill, smokeable material can pass into an opening in the wrapper 120 within the support 110. Preferably, the opening is narrower at the bottom of the opening than at the top of the opening and is shaped like a funnel or cone.

Figure 12:
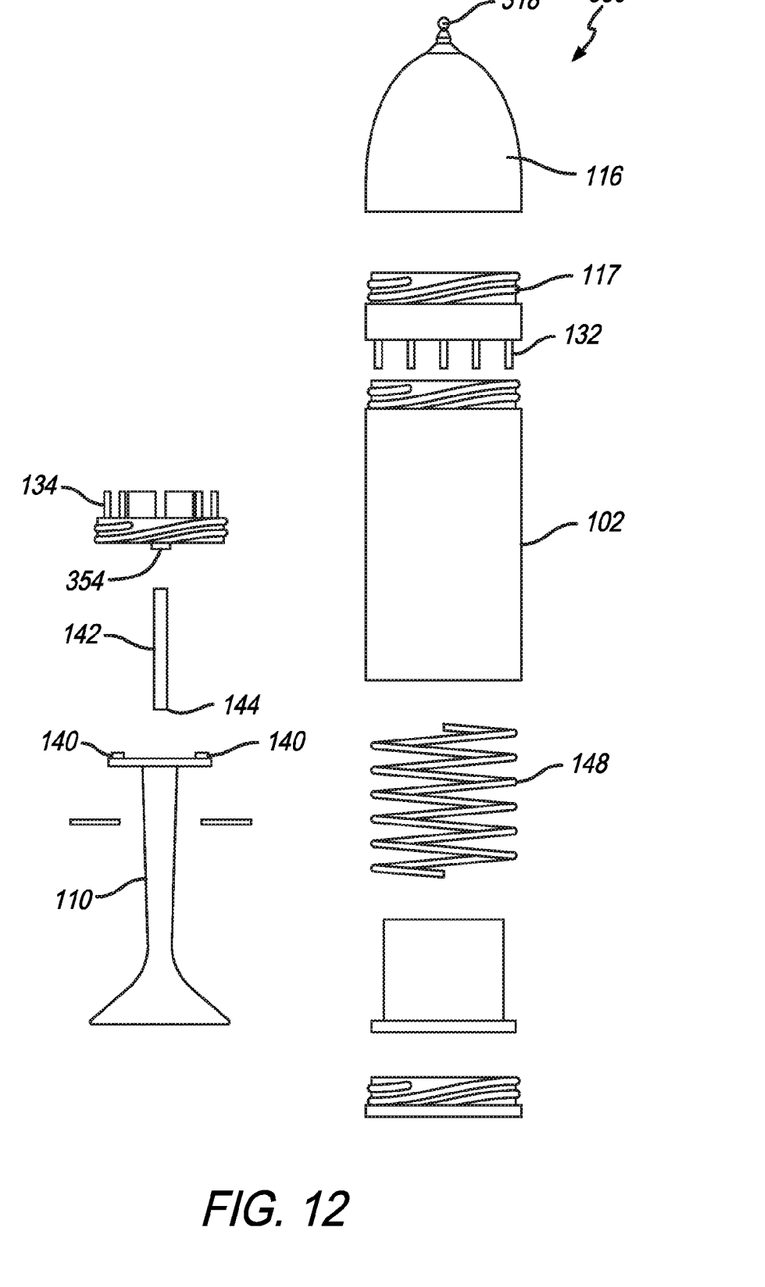
FIG. 12 is an exploded form elevation view of the apparatus of FIG. 10.
Figure 18:
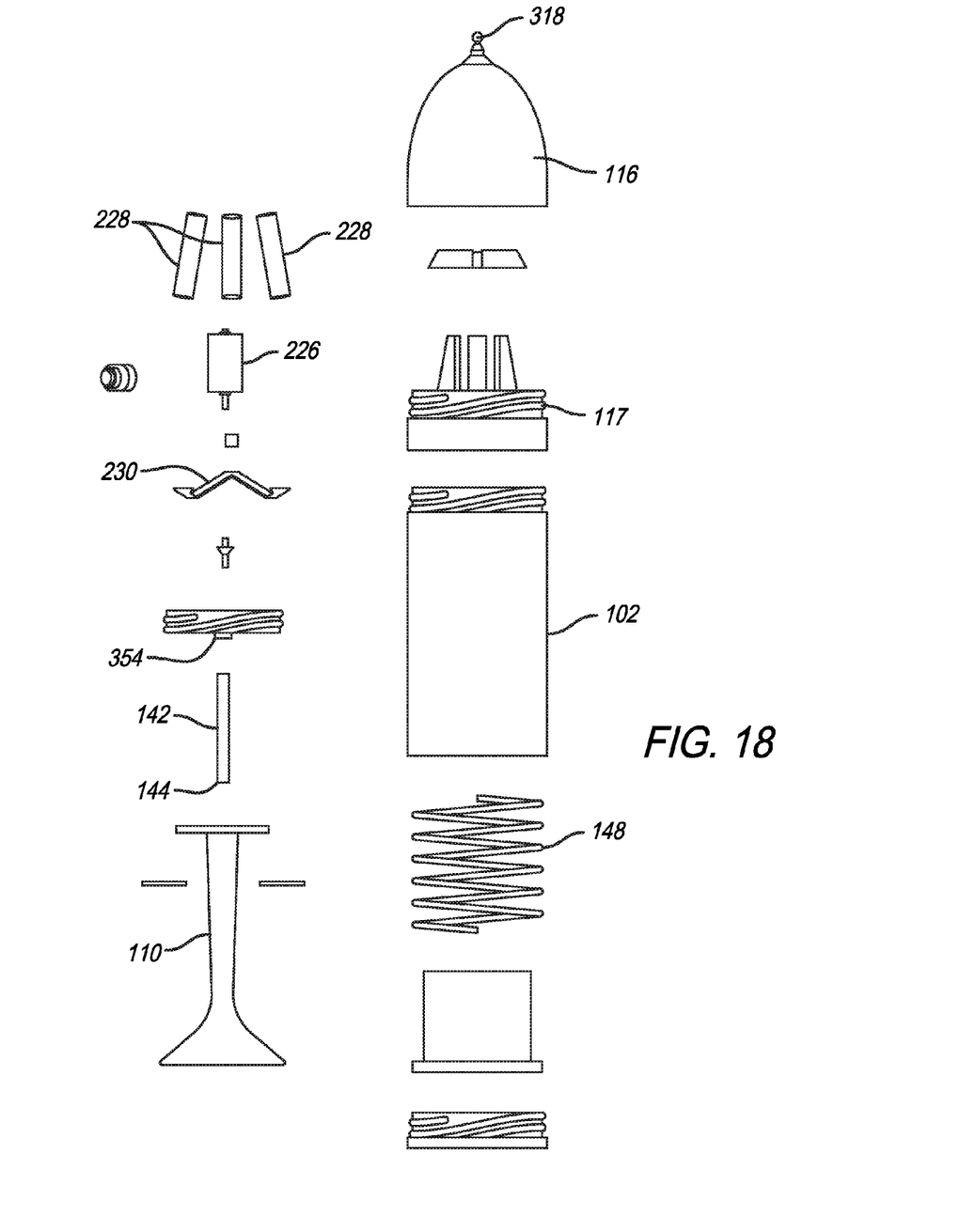
FIG. 18 is an exploded form elevation view of the apparatus of FIG. 16.

As shown in FIGS. 1-21, the apparatus 100, 200, 300, 400 can have a lid 116 above the upper chamber 104. As shown in FIGS. 12 and 18, it is contemplated that the lid 116 can be removable from the upper chamber 104 by, for example, threads 117 that unscrew and separate the lid 116 from the upper chamber 104. As shown in FIGS. 4 and 9, the lid 116 can also be joined to the upper chamber 104 by, for example, a hinge 152, and as such the lid 116 flips off the upper chamber 104 but remains connected to the upper chamber 104 by the hinge 152.

In one embodiment, the lid 116 can have a pushing projection 318 sized for pushing the wrapper 120 containing smokeable material partly out of the support 110, shown in FIGS. 10-21. Although it is preferred that the projection 318 is on the lid 116, it can be on other places on the wall 102. Also, more than one pushing projection 318 can be provided.

Figure 8:
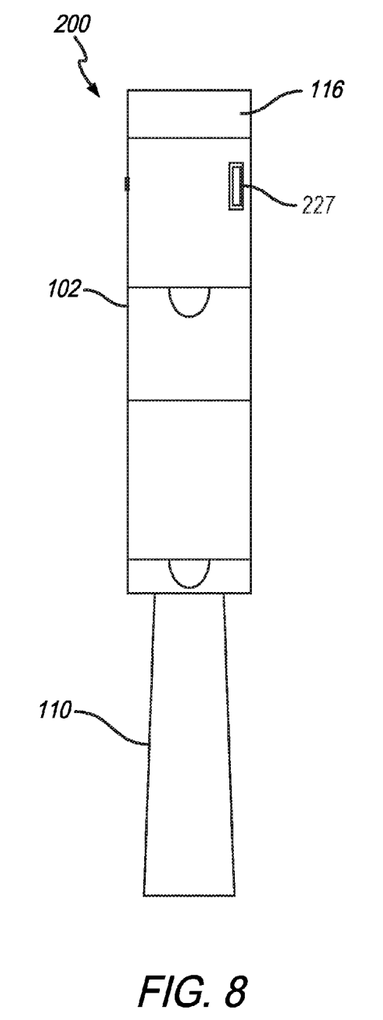
FIG. 8 is a side elevation view of the apparatus of FIG. 6 taken on line 8-8 in FIG. 6.
Figure 9:
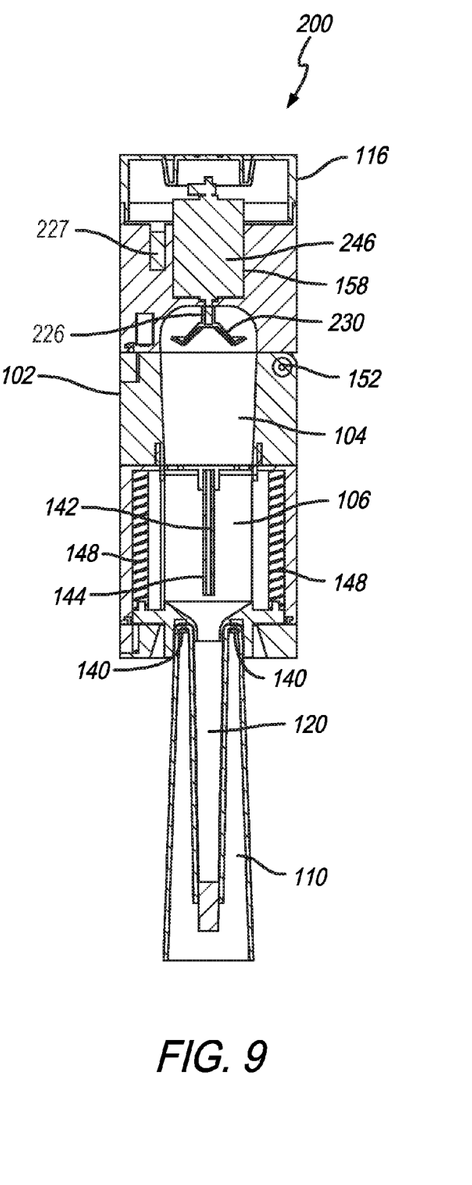
FIG. 9 is a longitudinal sectional view of the apparatus of FIG. 6 taken on line 9-9 in FIG. 6.
Figure 10:
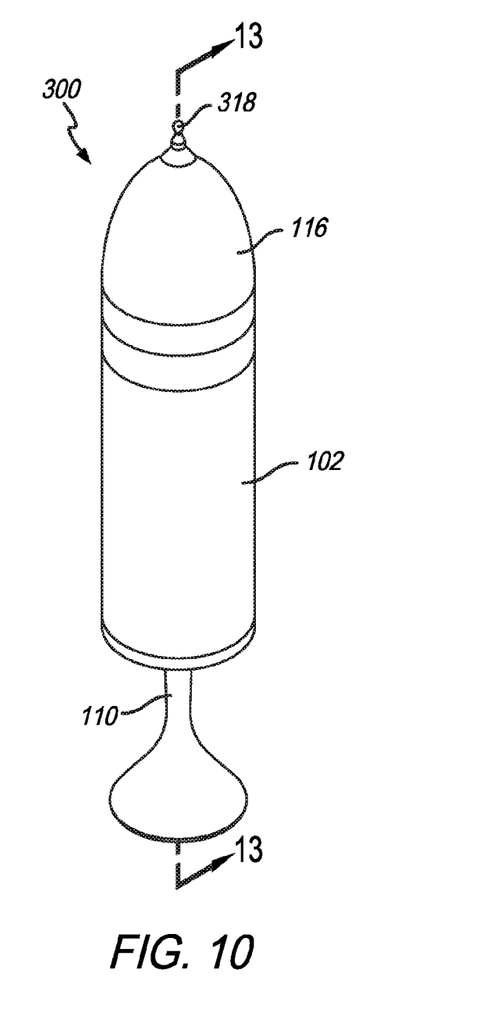
FIG. 10 is a perspective view of a third apparatus having features of the present invention.
Figure 11:
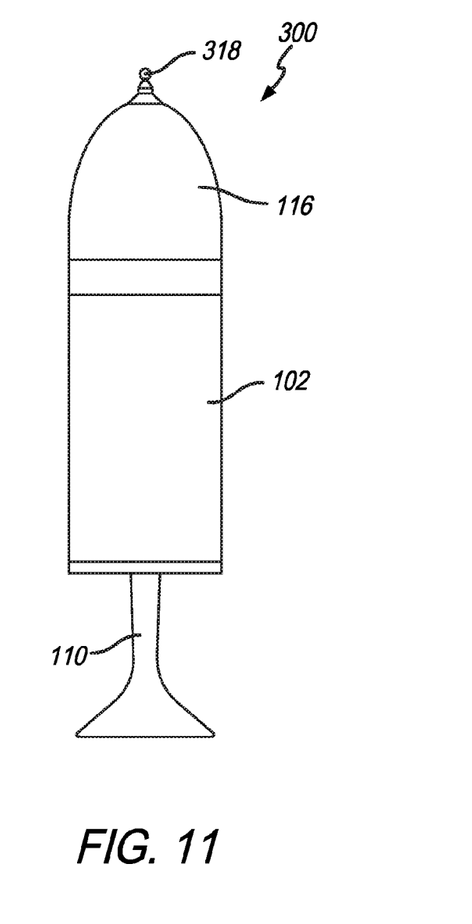
FIG. 11 is a front elevation view of the apparatus of FIG. 10.

In another embodiment, as shown in FIG. 8, the apparatus can contain means for electrically charging the apparatus such as, for example, a USB port 227 or port for a battery charger such as a DC port.

The apparatus 300, 400 can also have a storage area 324 for storing the smokeable material, as shown in FIGS. 13-15 and 19-21. Preferably, the storage area 324 is located above the upper chamber 104. The storage area 324 can be accessed by separating the storage area 324 from the upper chamber 104, or it can be accessed by the fill inlet 156.

In one embodiment, as shown in FIGS. 4 and 9, there is a cavity 158 above the upper chamber 104 and separated by a wall 102. The cavity 158 can contain a motor 246 if the device is powered, as shown in FIG. 9. Alternatively, the motor can be located in the lower chamber 106. The cavity 158 can also contain the energy source 228 for powering the motor 246, such as, for example, a battery holder and batteries.

The upper chamber 104 can be accessed by unfastening a portion of the wall 102, such as, for example, unfastening the lid 116, as shown in FIGS. 12 and 18.

As shown in FIGS. 4, 9, 12-15 and 18-21, the apparatus 100, 200, 300, 400 also contains a size reducer in the upper chamber 104 for reducing the size of the feed smokeable material into fill smokeable material such that the fill smokeable material can pass through the holes 114 in the grate 112 and into the lower chamber 106. However, some or all of the feed smokeable material may already be sized to pass through the grate 112. Thus, although there is a size reducer in the apparatus 100, 200, 300, 400, it does not always need to be used.

Any mechanism for reducing the size of feed smokeable material can be used; however, it is contemplated that the mechanism can be a blade, a grinder, a chopper, a mincer, or a combination thereof. The size reducer can be activated manually or automatically.

An exemplary size reducer that can be used manually or powered with the motor 246 is a grinder having a first plate with grinding projections 132 opposed to a second plate with grinding projections 134 for grinding feed smokeable material therebetween, as shown in FIGS. 4, 9, and 12-15. In one aspect, the second plate with grinding projections 134 can be attached to the grate 112.

With a manual rotatable size reducer, as shown in FIGS. 4 and 12-15, the upper portion of the wall containing the upper chamber 104 can be rotatable relative to the lower portion of the wall containing the lower chamber 106 and is graspable by a user's hand. In use, a user grasps the upper portion of the wall containing the upper chamber 104 in one hand, the lower portion of the wall containing the lower chamber 106 in the other hand, and twists the two portions relative to each other.

Another exemplary automatic size reducing mechanism, shown in FIGS. 9 and 18-21 is a rotatable size reducer, such as a rotatable blade 230, which is rotatable from 1 to 360 degrees in a clockwise direction, counterclockwise direction, or both directions. It is not a requirement that the blade can fully rotate 360 degrees.

As shown in FIGS. 9 and 19-21, in an apparatus 200, 400 containing an automatic size reducing mechanism, there is a drive 226 that is connected to the motor 246 with a power source 238 for rotating the automatic rotatable size reducer. A typical motor 246 has a horsepower of from about 0.001 to 4. The power source 238 can be powered by an electric current provided by an alternating current (AC) or a direct current (DC). Sources of direct current are, for example, batteries, thermocouples, and solar cells. The motor 246 can be controlled by a switch used to turn the power source 238 off and on, or incrementally varying the speed of the motor 246. It is contemplated that the motor 246 can be run at variable speeds.

In addition, the motor 246 can be used to vibrate, or shake, the entire apparatus 200, 400 such that the fill smokeable material passes from the upper chamber 104, through the grate 112, into the lower chamber 106, and into the wrapper 120. It is contemplated that one or more than one motor 246 can be used to vibrate the apparatus in an apparatus containing either manual or automatic size reducers to aid in packing the fill smokeable material into the wrapper 120. A suitable motor that can cause vibration and drive the size reducer is any micro DC motor or brushless motor, as described above, as long as the motor is powerful enough to shake the wall 102 or entire device. Alternatively, a counterweight can be mounted to the motor shaft which causes vibration though the entire apparatus. In one embodiment, the vibration of the apparatus 200, 400 causes the free end 144 of the tamper 142 to whip back and forth. The whipping action also helps to pack the smokeable material into the wrapper 120.

The apparatus 100, 200, 300, 400 also contains a support 110 as shown in FIGS. 1-21. The support 110 is used to support the wrapper 120 below the lower chamber 106. The support 110 has a generally cylindrical elongated opening for receiving the wrapper 120 and a tubular portion that holds the wrapper. The support 110 can extend through the opening of the lower chamber 106. In one aspect, the support 110 is removably attached to the lower chamber 106 by, for example, magnets 140.

The wrapper 120 can be made from paper or other combustible material. The wrapper 120 is sized to fit into the support 110. For example, the size of the wrapper 120 can be between about 15 cm and about 50 cm long, and can be up to 5 cm wide in diameter at the top and 10 mm wide in diameter at the bottom if conical. The shape of the wrapper 120 can be any shape to fit the support, for example it can be conical or straight. A conically shaped wrapper 120 can have a larger diameter at the fill end and a small diameter at the opposite end. The wrapper 120 has a sealed end that, in use, is placed at the lower end of the support 110, and an open end at the top of the support 110. The apparatus 100, 200, 300, 400 can be provided with multiple supports 110, such as a conical support for conical wrappers and a support with substantially constant internal diameter for straight wrappers.

Figure 15:
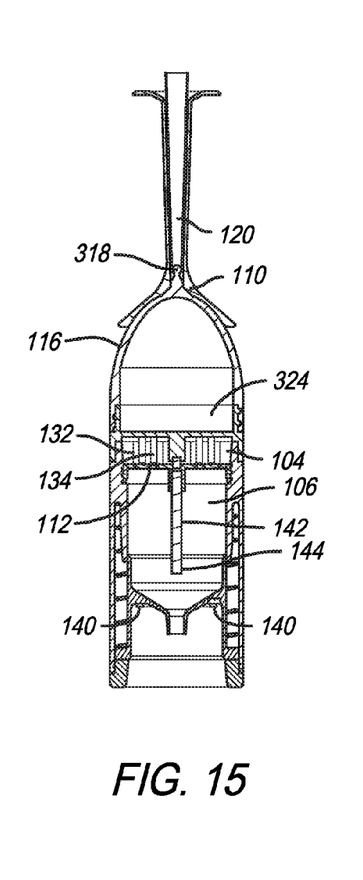
Figure 16:
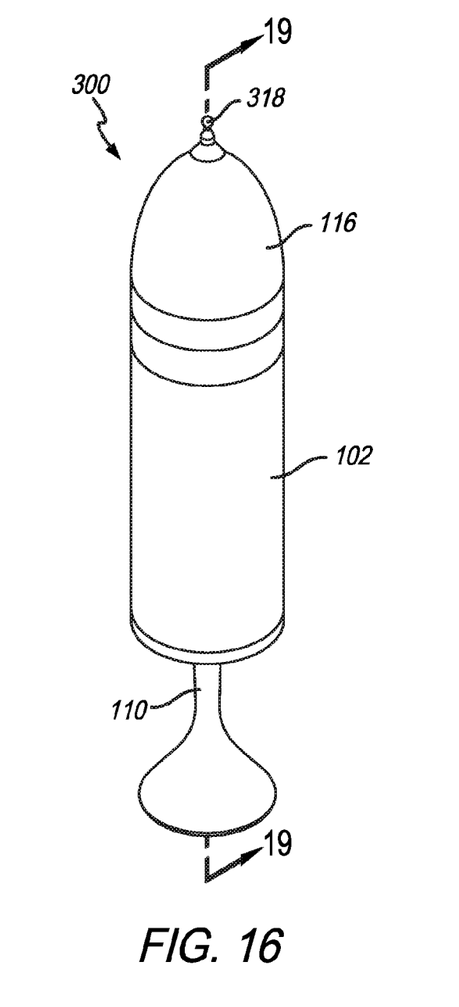
FIG. 16 is a perspective view of a fourth apparatus having features of the present invention.
Figure 17:
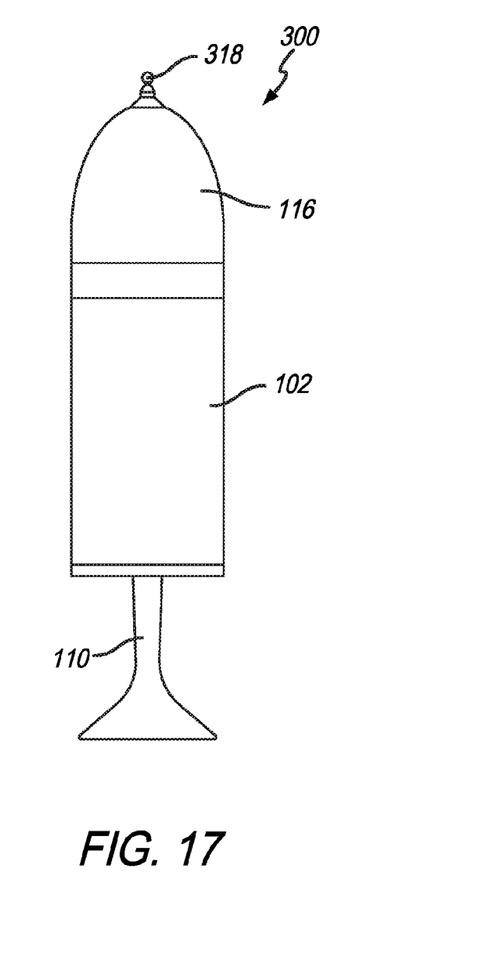
FIG. 17 is a front elevation view of the apparatus of FIG. 16.
Figure 21:
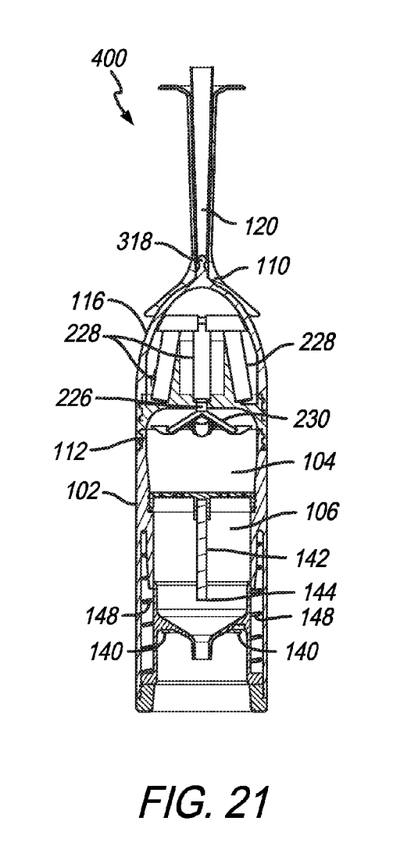

The support 110 can be removed from the lower chamber 106 of the wall 102 and attached to the lid 116 such that the projection 318 on the lid 116 can push the wrapper 120 containing smokeable material partly out of the support 110, as shown in FIGS. 15 and 21.

As shown in FIGS. 4, 9, 12-15, and 18-21, the apparatus 100, 200, 300, 400 can contain a tamper 142 for tamping smokeable material into the wrapper 120. The tamper 142 is located in the lower chamber 106, and can be secured or removably secured to the grate 112. The tamper 142 is axially movable, having an upper position and a lower position such that the fill smokeable material is tamped into the wrapper 120. The free end 144 of the tamper 142 is sized so that it can fit into the open end of the wrapper 120. Preferably, the tamper 142 also provides a piston-like effect so that pushing downwardly compresses air in the lower chamber, thereby forcing fill smokeable material into the open end of the wrapper 120 and compressing it therein for a consistent, uniform smoke. In one embodiment, it is contemplated that the tamper 142 can be removably secured to the grate 112 by means of a magnet 354 as shown in FIGS. 12 and 18.

The tamper 142 can be rigid or flexible depending on the hardness of the material used. Preferably, the tamper 142 can be made from a soft material, such as, for example, a polymer such as rubber, or a spring such as a metal spring. The hardness of the tamper 142 is in the range of from about 15-30 on a durometer shore 00 hardness scale and up to 80 on a durometer shore D hardness scale. It is contemplated that the tamper 142 can be removable and replaceable, and thus sold separately from the remainder of the apparatus 100, 200, 300, 400 so that tampers of different hardness, and thus different flexibilities, can be used or worn out tampers 142 can be replaced. In one aspect, only the bottom portion of the tamper 142 need be flexible.

The apparatus 100, 200, 300, 400 is biased so that the wall 102 and the tamper 142 is in an upper position, as shown in FIGS. 4, 9, 13 and 19. The biasing can be done via any biasing means, such as, for example, a piston or one or more springs 148 located, for example, within the wall of the apparatus 100, 200, 300, 400, as shown in FIGS. 4, 9, 13-15 and 19-21. In one embodiment, the spring 148 can be sized to span the circumference of the wall 102. Alternatively, there can be two springs 148 placed on opposite sides of the wall 102.

Figure 13:
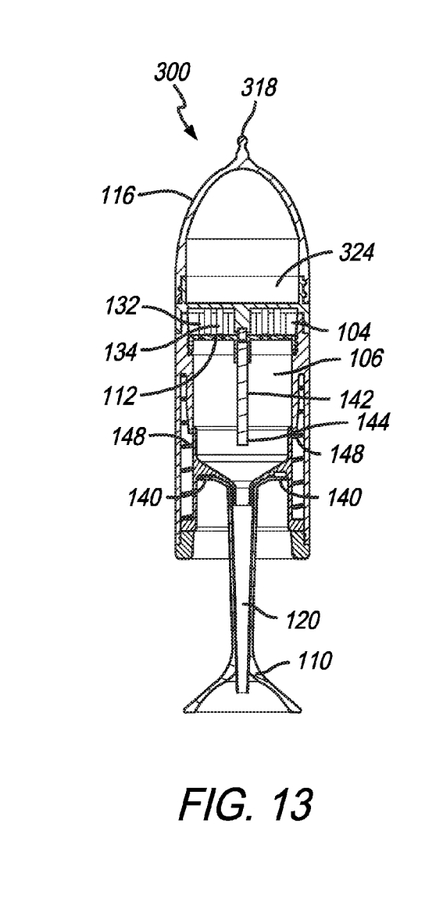
FIG. 13-15 are partial longitudinal sectional views of the device of FIG. 10 taken on line 13-13 in FIG. 11 showing the positions of the device during its use.
Figure 14:
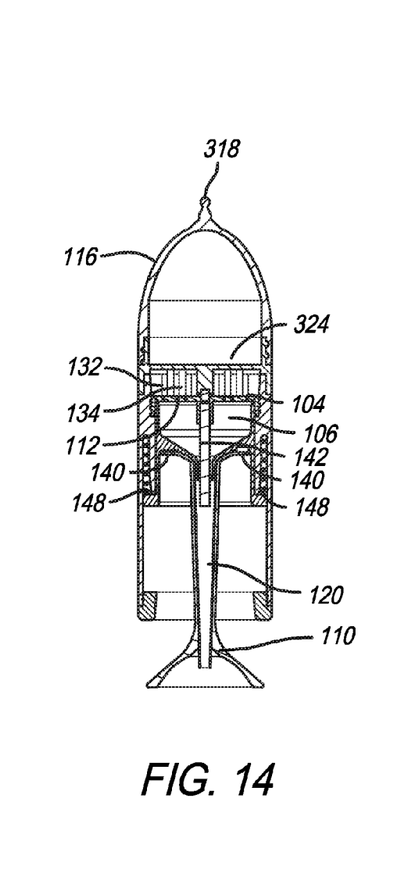
Figure 19:
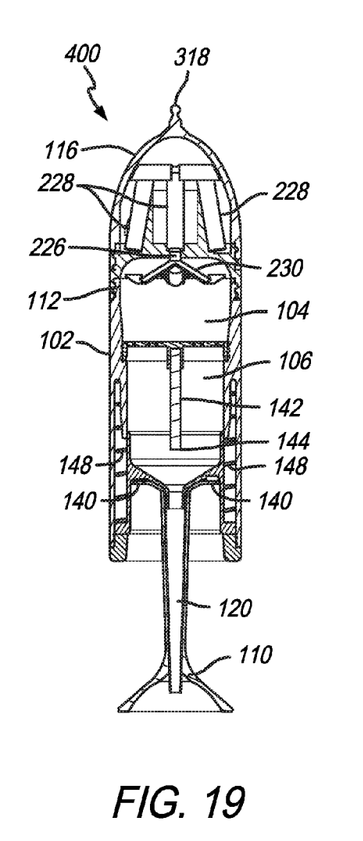
FIGS. 19-21 are partial longitudinal sectional views of the device of FIG. 16 taken on line 19-19 in FIG. 16 showing the positions of the device during its use.
Figure 20:
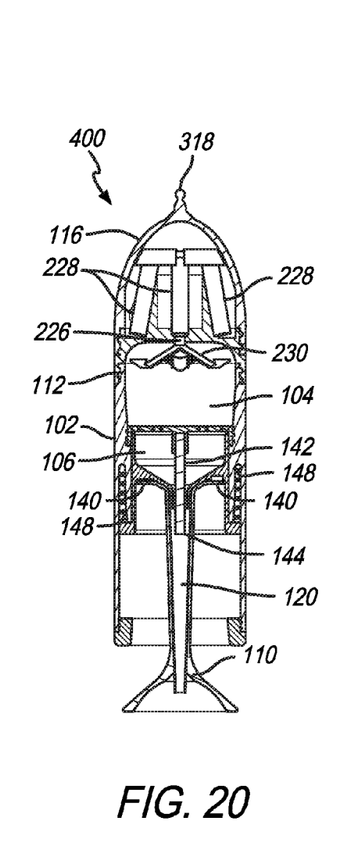

In use, the wall 102 is movable downwardly from an upper position to a lower position relative to the support 110 for moving the grate 112 downwardly, thus causing the tamper 142 to move downwardly for tamping smokeable material in the wrapper 120. FIGS. 13 and 19 show an embodiment of the apparatus 300, 400 and tamper 142 in a first upper position. The user can push the top of the apparatus 300, 400 in a downward direction, axially moving the tamper 142 so that the tamper 142 moves to a second lower position into the wrapper 120 as shown in FIGS. 14 and 20. The user then releases the top of the apparatus 300, 400 such that the tamper 142 returns to the first position. The user can remove the support 110 from the lower chamber 106, and use the projection 318 on the lid 116 to push the wrapper 120 out of the support 110, as shown in FIGS. 15 and 21.

The apparatus 100, 200, 300, 400 of the invention preferably contains one or more of the elements described above integrated into a single device, preferably sized to be handheld.

The invention also provides a kit containing an apparatus 100, 200, 300, 400 for preparing a smokeable product, as described above. The kit contains a removable first tamper 142. The kit also contains one or more removable second tampers 142. The removable second tamper 142 can have a hardness that is identical to the first tamper 142. Alternatively, the second tamper 142 can be more hard or less hard than the first tamper 142.

An alternate kit of the invention can contain an apparatus 100, 200, 300, 400 as described above with a removable first grate 112. The kit also contains a removable second grate 112 with holes that differ in size from the first grate 112. It is also contemplated that a kit of the invention contains both removable and replaceable tampers 142 and removable and replaceable grates 112.

In use, a user places feed smokeable material through the fill inlet into the upper chamber 104. The user also places a wrapper 120 in the support 110 and places the support on the apparatus 100, 200, 300, 400. The user then activates the size reducer so at least a portion of the feed smokeable material falls through the grate 112 as fill smokeable material into the lower chamber 106.

For operation of the size reducer in an apparatus 100, 300 with a manual size reducer such as a grinder, the user can, for example, twist the portion of the apparatus 100, 300 containing the wall 102 with the upper chamber 104 containing the first grinding plate 132 in a clockwise direction, while simultaneously twisting the lower chamber 106 the second grinding plate 134 in the opposite, counterclockwise direction. Once most or all of the feed smokeable material is sized to fall through the grate 112, the user can stop twisting the upper 104 and lower chambers 106. Alternatively, for operation of the size reducer in an apparatus 200, 400 with an automatic size reducer, such as a rotatable blade 230, the user can, for example, switch on the motor 246 via a switch 250 on the outside of the apparatus 200, 400. The motor 246 is attached to a drive 226, which drives power to the rotatable blade 230 so that it can rotate. Once most or all of the feed smokeable material is sized to fall through the grate 112, the user can switch off the motor 246.

The fill smokeable material thereafter falls through the opening into the wrapper 120. If desired, the user can force the tamper 142 downwardly against the force of the biasing means for tamping fill smokeable material in the wrapper 120. If needed, the user can inspect the wrapper 120 for the desired amount of fill smokeable material in the wrapper 120, and thereafter repeats the steps one or more times until the desired amount of fill smokeable material is contained in the wrapper 120.

Thereafter, the user can remove the support 110 from the lower chamber 106 and remove the filled wrapper 120 from the support 110. In one aspect, the user can remove the support 110 from the lower chamber 106 and use the projection 318 on the lid 116 to push the wrapper 120 containing fill smokeable material from the support 110. The user then closes the opening of the wrapper 120, thus forming a smokeable product.

It is contemplated that the time for the smokeable product to be produced from the starting feed smokeable material is ten seconds or less.

EXAMPLES

Example 1—Apparatus

An apparatus to prepare a smokeable product was assembled. The size of the apparatus is approximately 150 mm at the maximum diameter. The apparatus had a wall which provided an upper chamber and a lower chamber. There was a grate located between the chambers. The hole size of the grate was 5 mm with 30 holes per square 25 cm. The apparatus also had a removable lid above the upper chamber for placing feed smokeable material into the upper chamber. The lid contained a projection that can be used for pushing a filled wrapper out of the support.

Also in the lid area was a motor, a power source for powering the motor, and a drive between the motor and a rotatable blade to rotate the blade. The rotatable blade was located on the upper surface of the wall of the upper chamber. The speed of the motor was varied by means of a switch located on the outside of the wall.

The apparatus also had a support below the lower chamber for supporting a paper wrapper. The support was removably attached to the lower chamber by magnets. The support was 130 mm long and 24 mm wide. The wrapper was conically shaped and was 100 mm long, 10 mm in diameter at the top and 5 mm in diameter at the bottom. The wrapper was sealed at the bottom before it was placed into the support. The lower chamber had an opening for fill smokeable material to pass into the wrapper. The apparatus also had an axially movable tamper made out of rubber located in the lower chamber. The tamper had an upper position and a lower position. There was a spring for biasing the tamper into its upper position, as well as a mechanism for moving the tamper from its upper position to its lower position against the spring biasing means.

Example 2—Method of Using the Apparatus

The apparatus described in Example 1 was used to fill a cigarette. To use, the user removed the lid above the upper chamber and placed feed smokeable material into the upper chamber. The user also placed a conical-shaped paper wrapper that was sealed on one side and open on the opposite side in the support and attached the support to the lower chamber. The user then activated the motor driving the rotatable blade with the switch. After activation, a portion of the feed smokeable material fell through the grate into the lower chamber.

Once the user believed enough of the feed smokeable material was cut to fall through the grate and fill the wrapper to a desired amount, the user turned off the motor. The cut smokeable material fell through the opening into the wrapper. To compress the fill smokeable material, the user forced the tamper downwardly against the force of the spring biasing means. The user inspected the wrapper for the desired amount of fill smokeable material in the wrapper, and repeated some of the steps until the desired amount of fill smokeable material was contained in the wrapper. In some instances it was necessary to start up the motor to cut additional feed material.

The user then removed the support from the lower chamber and used the projection on the lid to push the wrapper containing fill smokeable material from the support. The user then closed the opening of the wrapper, forming a cigarette.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A portable, hand-holdable apparatus for preparing a smokeable product comprising:
   a) an enclosing wall forming a chamber;
   b) a grate provided within the chamber, thereby separating the chamber into an upper chamber and a lower chamber;
   c) a fill inlet for placing feed smokeable material into the upper chamber;
   d) a cutting mechanism comprising:
      i) a rotatable blade in the upper chamber for cutting the smokeable material in the upper chamber a sufficient amount such that the cut smokeable material can pass through the grate into the lower chamber to provide fill smokeable material;
      ii) a motor for rotating the blade;
      iii) a power source for driving the motor; and
      iv) a switch for turning the power source off and on;
   e) a support for supporting a wrapper below the lower chamber and removably attached to the lower chamber;
   f) an opening in the lower chamber for fill smokeable material that passes through the grate to pass into the wrapper supported by the support;
   g) a tamper in the lower chamber secured to the grate for tamping fill smokeable material in the wrapper; and
   h) a spring biasing the enclosing wall to an upper position, wherein the enclosing wall is movable downwardly from the upper position to a lower position relative to the support for moving the grate downwardly for causing the tamper to move downwardly for tamping fill smokeable material in the wrapper, and
   wherein the apparatus is portable and is sized and shaped to be held by hand by a user.

2. The apparatus of claim 1, wherein the support is tubular with a generally cylindrical elongated opening for receiving the wrapper.

3. The apparatus of claim 1, wherein the lower chamber is conical shaped comprising a top opening and a bottom opening, and wherein the bottom of the opening is narrower than the top of the opening.

4. The apparatus of claim 1, further comprising a wrapper in the support.

5. The apparatus of claim 1, wherein the support is removably secured to the lower chamber, and can be removed from the lower chamber of the enclosing wall and attached to the upper chamber of the enclosing wall.

6. The apparatus of claim 1, wherein at least a portion of the tamper is made from flexible material.

7. The apparatus of claim 1, wherein the grate is removable.

8. The apparatus of claim 1, wherein the fill inlet is accessed by an opening in the upper chamber.

9. The apparatus of claim 8, wherein the opening is accessed by a door in the upper chamber.

10. The apparatus of claim 1, wherein the switch provides variable speeds for the motor.

11. The apparatus of claim 1, comprising a projection on the enclosing wall sized for pushing wrapper partly out of the support.

12. The apparatus of claim 1, wherein the grate is removable and replaceable so that a grate with different hole size can be used.

13. The apparatus of claim 1, wherein the support extends through the opening of the lower chamber.

14. The apparatus of claim 1, wherein the motor is adapted to vibrate the apparatus.

15. A method for using the apparatus of claim 1, comprising the steps of:
   a) placing the feed smokeable material through the fill inlet into the upper chamber;
   b) supporting the wrapper with the support; and
   c) activating the cutting mechanism for reducing the size of the feed smokeable material so at least a portion of the feed smokeable material falls through the grate as the fill smokeable material into the lower chamber and thereafter through the opening into the wrapper.

16. The method of claim 15, further comprising step d) inspecting the wrapper for the amount of smokeable material in the wrapper, and thereafter repeating step c).

* * * * *